3,158,548
NUCLEAR REACTORS AND FUEL ELEMENTS
THEREFOR
Shirley Russell Hopkins, Lymm, England, assignor to United Kingdom Atomic Energy Authority, London, England
Filed June 15, 1962, Ser. No. 202,865
Claims priority, application Great Britain July 4, 1961
3 Claims. (Cl. 176—77)

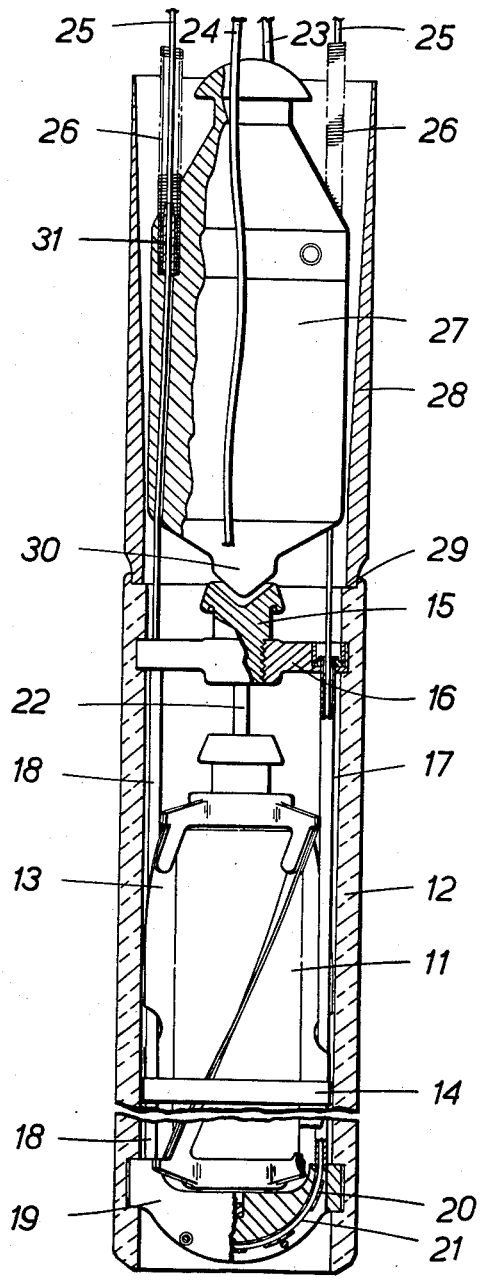

The present invention relates to nuclear reactors and is more specifically concerned with the kind of nuclear reactor in which fuel elements are stacked in columns in the core. Stacking in this manner is utilised in thermal reactors where it is usual for each column to be supported in a channel extending vertically within a moderator structure.

There are advantages to be gained by charging the fuel elements into the allotted position in the core either as a complete column or, at least, as portions of more than one element. The chief advantages are the saving of time as compared with the alternative of handling the elements individually and the easing of difficulties which can arise when ancillary equipment, such as thermocouples for measuring the fuel temperature, has to be installed. Whereas charging can be effected from an unshielded flask, the equivalent receptacle for discharged elements is necessarily heavily shielded and an increase in its height for the purpose of accommodating a number of stacked elements may be undesirable economically.

It is now proposed for assembling, or subsequently servicing, a nuclear reactor core that superposed fuel elements introduced as a unit into the core are rendered dischargeable individually. More specifically, the charging of superposed elements as a unit is carried out, in accordance with the invention, with the lowermost element suspended and those above supported serially on it. The means by which the lowermost element is suspended may be arranged to retain positively the requisite alignment of the several elements; conveniently such positive retention is obtained by a preassembly procedure involving stringing the fuel elements on the means of suspension. Such means is preferably freed from the lowermost element by remote operation and is completely withdrawn from the vicinity of the elements when they have been settled in the core; a neutron capturing characteristic is to be expected in the material of the suspension means which may become highly radioactive if left for a time in the core. Its immediate withdrawal therefore benefits the neutron economy in the core and avoids the use of heavy shielding for the withdrawal equipment.

The invention resides also in fuel elements when held in superposed relationship in a manner enabling them to be lifted and lowered as a unit by linking means which is removable by an operation remote from the elements and, when thus removed, frees the elements for handling individually. In its simplest form the linking means is a freely flexible ligament, a cable being an obvious example. This cable is preferably lapped to form a sling between two lifting ends and the lowermost element is suspended in the proper upright attitude in the loop of the sling. The invention therefore provides further, for use as this lowermost element, an elongate nuclear reactor fuel element having channels wherein to locate a sling for suspending the element in an upright attitude.

One particular example of the invention will now be described in greater detail with reference to the accompanying drawings which shows in axial action a string of fuel elements for a thermal nuclear reactor, the string being suspended by a cable sling in readiness for charging into the core. Although only the top of the uppermost element and the bottom of the lowermost element appear in the drawing, it is to be assumed for the purposes of the present example that the string is composed of four elements, these being superposed contiguously end to end in upright attitude.

The illustrated fuel element is of a kind in which nuclear fuel sealed in finned sheathing indicated 11 of a magnesium base alloy is supported in a cylindrical tube of graphite 12. Helically extending swirlers 13 project beyond the finning of the sheath to the inner surface of the tube 12, and are braced at intervals along the length of the element by encircling support bands, such as 14. At the top of the element is a lifting lug 15 secured centrally in the tube 12 by a metal spider 16. Except in the case of the lowermost element, a metal bridge (not shown) is fixed diametrically within the tube just inside its lower end and serves the purpose of supporting the sheathed component. This bridge in the case of the lowermost element is subject to the modifications, now to be described, which enable the elements to be strung on the cable sling.

In each element two open-ended metal tubes 17 and 18, for example of thin stainless steel, extend continuously at diametrically opposed positions close to the inner surface of the tube 12 between the top spider 15 and the bottom bridge and so form enclosed channels through which to pass the cable sling. The swirlers 13 are notched to give free passage to these tubes. The bottom bridge 19 of the lowermost element incorporates a further length 20 of similar tubing which is fashioned into an arc presenting the open ends of the tubing length in alignment with, but separated by a small clearance from, the adjacent open ends of the tubes 17 and 18. Slots, such as 21, are cut through the tubing length 20 at intervals to afford access to the cable. A further fitting included in all except the lowermost element is a tube 22 situated and mounted similarly to the tubes 17 and 18 but offset in a plane at 90° to that in which the latter lie. This tube 22 is included on the assumption that the lowermost element is to be equipped with at least one thermocouple (not shown) the wires 23 of which are passed upwards through the tubes 22 of the three upper elements to the top of the fuel element string. At this point the wires 23 join company with wires 24 of at least one thermocouple (not shown) on the uppermost element.

The lengths of cable 25 extending above the fuel element string are encased in flexible metal conduit 26 of helically wound wire which can be coiled together with the cable on a winding drum. Both lengths of flexible conduit have their ends anchored in common by clamping between the halves of a split dolly 27 which is of a generally flat shape fitting with clearance inside a capping piece 28 of the same magnesium base alloy as the fuel sheathing, this capping piece being seated at its bottom end on a step 29 formed in the top of the tube 12 of the uppermost element. The bottom end of the dolly presents centrally a cone 30 engageable in a cup of the lifting lug 15. A ferrule 31 may if necessary be crimped on the cable to resist by engagement directly with the dolly any tendency for the latter to creep up the cable during unwinding from the winding drum.

The string of fuel elements complete with capping piece is pre-assembled externally of the vessel containing the reactor core and at this stage the thermocouple wires 23 and 24 are arranged correctly to lead out from the top of the string. Introduction of the string into the allotted position in the core is by lowering from the charge face. The path followed by the string in being introduced may include slight changes of direction, as in the case where a single hole in the charge face is adapted to give access to several fuel element columns in the core by means of a swinging chute. The flexibility of the cable sling permits articulation of the string for negotiating such directional changes but to ensure that articulation is not resisted by the dolly the relative positioning of the cable in the flexible conduit is so adjusted that with the string straight a clearance is maintained between the cone 30 of the dolly and the cup of the lifting lug 15. Consequently the elements can spread themselves apart to the extent required for articulation but are prevented from separating to a greater extent.

When the string has been settled in the reactor core, in the present case on top of previously charged elements, one end of the cable is freed at the winding drum and by pulling the other end it is drawn out of the fuel elements. The freed cable end, when released from the charge face, is prevented by the flexible conduit from dropping without guidance and support, and therefore the danger of the cable becoming caught where access is difficult is avoided. The dolly is then withdrawn by rewinding on the winding drum and the fuel elements are left unlinked in the reactor core with only the fitted tubing remaining from the equipment necessitated by the string charging operation.

I claim:

1. A string of elongate nuclear reactor fuel elements superposed one upon another to form a column, two open ended tubes for each element extending at diametrically opposed positions lengthwise along each element and a removable, freely flexible ligament passing through the open ended tubes supporting the lowermost element in an upright attitude and linking the string of fuel elements together.

2. A string of nuclear reactor fuel elements as claimed in claim 1 wherein each fuel element except the lowermost fuel element is provided along its length with a third open ended tube being positioned in a plane offset from that of the first two open ended tubes by the same amount on each of said elements.

3. A string of superposed elongate nuclear reactor fuel elements forming a column, a member on the lowermost fuel element defining an arcuate channel for a cable sling, two open-ended tubes on each fuel element extending along the length of said fuel elements at diametrically opposed positions and aligning with the ends of said channel, a dolly disposed above said fuel element string and locatable thereupon, two flexible conduits anchored in said dolly to extend upwards therefrom in the same plane as said tubes, and a cable sling passing through said conduits, said dolly, said tubes and said channel.

References Cited in the file of this patent

UNITED STATES PATENTS 2,985,575     Dennis et al.  ---------- May 23, 1961

FOREIGN PATENTS 1,214,056     France  ---------------- Nov. 2, 1959
826,228     Great Britain  ---------- Dec. 31, 1959
232,446     Australia  -------------- Jan. 24, 1961